(12) United States Patent
Apperley et al.

(10) Patent No.: US 6,789,165 B2
(45) Date of Patent: Sep. 7, 2004

(54) DATA STORAGE ARRAY METHOD AND SYSTEM

(75) Inventors: Norman Apperley, Chandlers Ford (GB); Matthew John Fairhurst, Winchester (GB); Carlos Francisco Fuente, Portsmouth (GB); William James Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 10/143,077

(22) Filed: May 10, 2002

(65) Prior Publication Data

US 2003/0212858 A1 Nov. 13, 2003

(51) Int. Cl.⁷ .............................................. G06F 12/00
(52) U.S. Cl. .......................................... 711/114; 714/6
(58) Field of Search .............................. 711/114; 714/6

(56) References Cited

U.S. PATENT DOCUMENTS 5,832,204 A * 11/1998 Apperley et al. ............. 714/42
6,321,345 B1 * 11/2001 Mann et al. ................... 714/6

* cited by examiner

Primary Examiner—Hiep T. Nguyen
(74) Attorney, Agent, or Firm—Robert B. Martin; Dillon & Yudell LLP

(57) ABSTRACT

A method and system for reading data from a redundant array of computer data storage media elements without having to wait for a timeout in a drive in the redundant array. If the requested data is from a drive that is temporarily in a timeout, the requested data is reconstructed using other drives in the redundant array, and the reconstructed data is sent to the requester via an array controller. When the drive holding the originally requested data comes back from the timeout and responds to the original request by transmitting the original data, the array controller ignores the original data since the request has already been fulfilled by the reconstructed data.

13 Claims, 2 Drawing Sheets

DATA STORAGE ARRAY METHOD AND SYSTEM

BACKGROUND OF THE INVENTION

1. Technical Field

This invention relates to in general to computers, and more specifically to data storage systems. Still more specifically, the present invention relates to a method and system for accessing data from a drive in a Redundant Array of Independent Disks (RAID) array while the drive is in a timeout mode.

2. Description of the Related Art

In the field of this invention it is known that configuring data storage media such as disk drives as members of a RAID array enables data to be retrieved even when a disk drive fails. Some applications, however, require not only that data is not lost but that the data in the array can be read within a short time (for example, within 10 seconds maximum).

There are several reasons why some data read from a disk drive may be delayed by more than 10 seconds even when the disk drive has not permanently failed.

For example, when a command has been lost within the disk drive, the adapter or controller that controls the disk drive must wait for the command to 'timeout' and take recovery steps when the timeout period is exceeded. The delay to recovering data due to a command being lost is typically over 30 seconds.

In another example, new disk drive firmware may be in the process of being loaded to the disk drive. This could take 30 seconds. Furthermore, a sector on the disk may be in the process of being reassigned, delaying a subsequent read command. This delay may be over 10 seconds.

Some computer systems cannot tolerate a delay of this length to complete an operation and under such conditions will terminate the application with an error. From European patent publication no. EP0926891A there is known a scheme for reconstruction of data for a member disk of a RAID array that would have resulted in that operation being completed quickly. However, this known scheme was for a specific application and required that a timeout period elapsed before data was reconstructed. This has the disadvantage that in a typical computer system many operations are queued, and the system cannot tolerate having to wait for all the timeouts of previous operations to have expired before reconstructing data.

A need therefore exists for a data storage array method and arrangement wherein the abovementioned disadvantage(s) may be alleviated.

SUMMARY OF INVENTION

The present invention accordingly provides a method and system for reading data from a redundant array of computer data storage media elements without having to wait for a timeout in a drive in the redundant array. If the requested data is from a drive that is temporarily in a timeout, the requested data is reconstructed using other drives in the redundant array, and the reconstructed data is sent to the requester via an array controller. When the drive holding the originally requested data comes back from the timeout, the drive might respond to the original request for the data by transmitting the originally requested data to the array controller. However, since the request for the originally requested data has been fulfilled by the transmission of the reconstructed data, the array controller ignores the originally requested data just received. As long as the drive is in timeout, it is in a reconstruct mode, performing the above described reconstruction and transmission. Subsequent requests for other data to the drive result in similar reconstructions as long as the drive is in timeout.

In a preferred embodiment, the data used to reconstruct the original data is an exclusive-OR equivalent of the original data, the data used for the reconstruction being held on each of the other media elements of the array. Alternately, the data used for the reconstruction is a duplicate copy of the original data, the data used for the reconstruction being held on at least one of the other media elements of the array. Likewise, data stored in other drives for use in reconstructing subsequent original data requested while the drive is in timeout is either an exclusive-OR or a duplicate copy of the subsequent original data.

In this way a data storage array method and arrangement is provided in which data may be returned by the array controller within a short time, as required by some applications, despite the first disk drive experiencing a protracted delay during the timeout.

The above, as well as additional objectives, features, and advantages of the present invention will become apparent in the following detailed written description.

BRIEF DESCRIPTION OF THE DRAWINGS

The novel features of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Storage disk arrays such as RAID (Redundant Array of Independent Disks) arrays operate by creating redundant data on portions (stripes) of each disk. The main purpose of such an arrangement is that if one of the physical disk drives of the array fails, the rest of the array remains active. Any data held on the failed disk drive may be recovered from the redundant data on other disks of the array.

The redundant data maybe held in different forms according to the type of RAID being used. In a RAID-5 array of n member disks, the first m bytes of the array data (where m is the stripe length) are held on the first disk, the second m bytes on the second disk and so on up to the n-1 disk. The nth disk holds the exclusive-OR (XOR) of the stripe data held on the other disks (1 to n-1) of the array. Data can be reconstructed for any disk that cannot return data by performing an XOR on the stripe data read from all the other member disks of the RAID-5 array. In a RAID-1 array, all the data of the array is duplicated on two disks.

For the purpose of explaining the present embodiment, a RAID-5 array is described. However, it will be appreciated that the invention is applicable to any RAID version, including future versions, which use a redundancy scheme similar to that described above.

Figure 1:
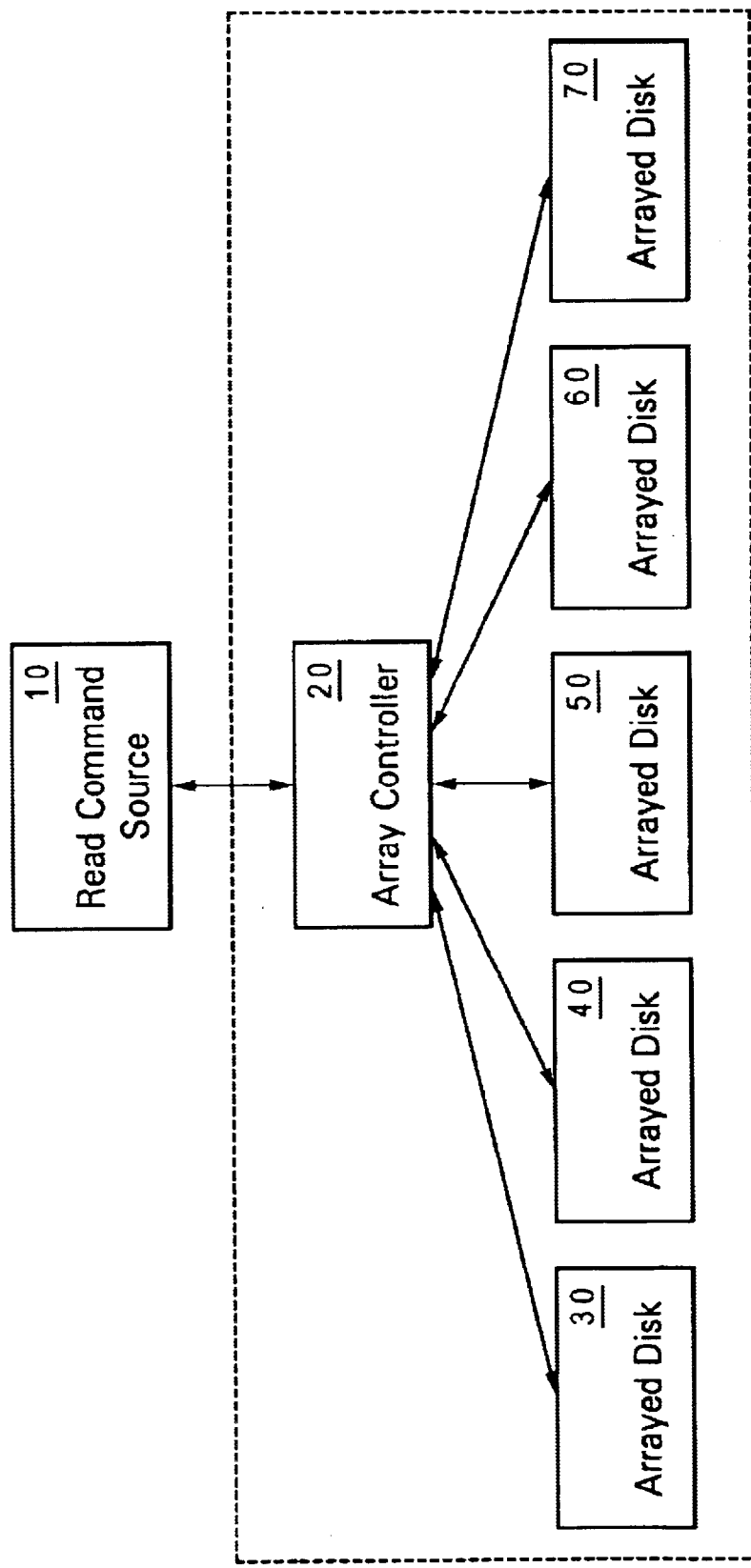
FIG. 1 shows a block diagram of a disk array used with the present invention; and, FIG. 2 shows an illustrative flow diagram of a method of operating the disk array of FIG. 1, in accordance with the present invention.

Referring to FIG. 1, there is shown a RAID-5 array, coupled to a read command source 10, which may be part of a computer system (not shown) or similar. The read command source 10 sends read commands to the RAID-5 array which relate to data held on the RAID-5 array.

The RAID-5 array includes a RAID controller 20, and a number of arrayed data storage media, such as hard disks. In this arrangement, five such disks are provided, namely a first arrayed disk 30, a second arrayed disk 40, a third arrayed disk 50, a fourth arrayed disk 60 and a fifth arrayed disk 70.

The functions of the RAID-5 array are managed by the RAID controller 20, which is coupled to receive the read commands from the read command source 10 and services these commands by exchanging data with the arrayed disks 30 to 70. In particular, the RAID controller 20 manages the placement of data in the array, and ensures that an element of redundancy is built into the regime of data storage, in a manner to be further described below.

The RAID controller 20 of FIG. 1 preferably uses a timing element, which may be a software or a firmware module. The function of the timing element will be further described below.

Figure 2:
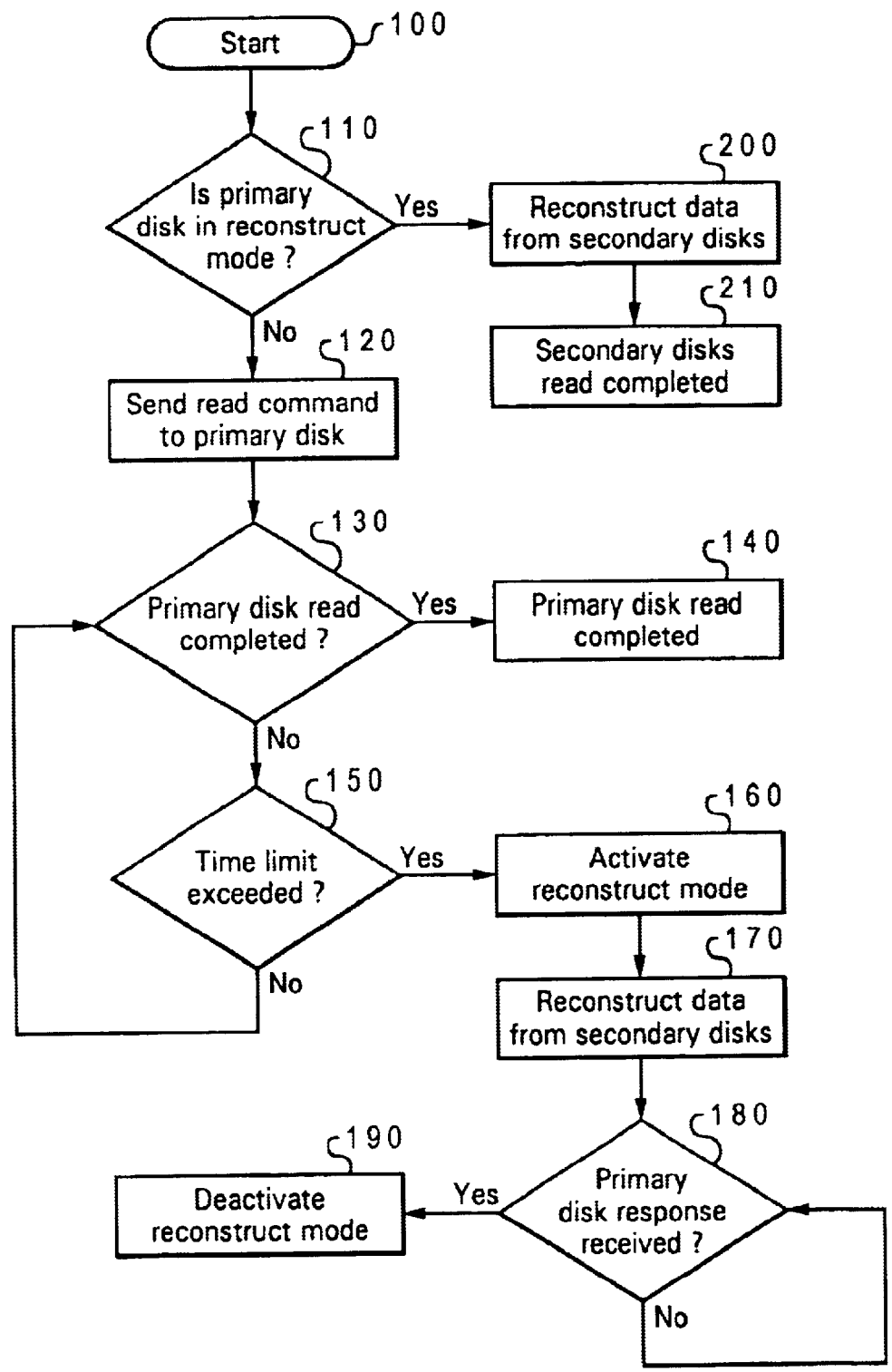

Referring now also to FIG. 2, a method of operating the RAID array of FIG. 1 in accordance with the present invention starts at box 100, where a read command is requested of the RAID controller 20 by the computer system. For the sake of example, this read command will be taken to be a request for data primarily held on the first arrayed disk 30. The RAID controller 20 has a timeout period of a short time, e.g. 3 seconds, set.

At box 110 the RAID controller 20 checks to see whether the first arrayed disk 30 is in 'reconstruct mode'. If not, then a read command is sent to the first arrayed disk 30 (box 120). If yes, this condition will be further described below.

At box 130 the RAID controller 20 monitors the progress of the read command. If the read command is completed from the primary disk (i.e. the first arrayed disk 30), then the process terminates at box 140. If the read command has not completed, a loop including boxes 130 and 150 is commenced. The timing module of the RAID controller 20 (see above) monitors whether or not the time limit has been exceeded (box 150). If the time limit has not been exceeded, the process returns to box 130 to check again whether the read command has completed. If the read command has been completed, the process terminates (box 140).

However, if the timeout period is exceeded, this means that the read command has not been completed from the first arrayed disk 30 in this period. The RAID controller 20 then places first arrayed disk 30 in a "reconstruct" mode (box 160) and reconstructs the required data by reading data from all of the alternate member disks of the RAID-5 array, namely the second, third, fourth and fifth arrayed disks 40, 50, 60 and 70 respectively, and performing a reconstruct operation (box 170) as described in the following paragraph.

The "reconstruct" mode is similar to the process used to reconstruct the data of one member disk when that disk fails by using the other member disks. This is achieved in the case of RAID-5 by an exclusive-OR of the data for that stripe held on all the other member disks of the RAID-5 array, or in the case of RAID-1 and RAID-10 by reading the data from the copy of the data on another member disk.

RAID controller 20 then uses the reconstructed data to satisfy the timed-out read command in place of the first arrayed disk 30. This will occur shortly after the timeout period has expired.

At some time later, unless catastrophic failure of the first arrayed disk 30 has occurred, the disk 30 will send the data for the original read command back to the RAID controller 20 (box 180). Having satisfied the command with the reconstructed data, the RAID controller 20 will discard (disregard) the data received, in response to the original read command, from the first arrayed disk 30.

However, this event alerts the RAID controller 20 to the fact that the first arrayed disk 30 is now responsive (indicating that the cause of the delay in servicing the read command may no longer be present) and it therefore terminates the "reconstruct" mode for the first arrayed disk 30 (box 180).

Turning back to consider subsequent read commands, at box 110, if a read command for data primarily held on the first arrayed disk 30 is received by the RAID controller 20 while the first arrayed disk 30 is in 'reconstruct' mode, this command will be dealt with using reconstructed data from other member disks of the RAID-5 array, as described above (boxes 200 and 210).

Therefore, in the case of a first read command causing the first arrayed disk to enter "reconstruct mode," subsequent read commands for data primarily held on the first arrayed disk 30 are serviced by reconstructed data unless or until the 'reconstruct mode' is terminated (box 190).

It will be understood that the above arrangement and method provides the advantage of returning read data requested from one of the array member disks that would otherwise be subject to a protracted delay, by reconstructing the data from the other member disks of the array in a timely manner.

It will be appreciated that alternative embodiments to the one described above are possible. For example, the process steps used by the RAID controller 20 may differ from those described above. Furthermore the precise regime used to provided redundancy in the disk array, and the number of disk drives present in the array may differ from that shown above. Further, while the arrayed storage media elements are described as different disk drives, it is understood that different storage media elements for storing original data, data used to reconstruct the original data and parity information used to reconstruct the original data may be on different partitions or different sections of a same disk drive.

The present invention may be embodied as a software computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

While the invention has been particularly shown and described with reference to a preferred embodiment, it will be understood by those skilled in the art that various changes in form and detail may be made therein without departing from the spirit and scope of the invention.

What is claimed is:

1. A method for reading data from a redundant array of computer data storage media elements, said method comprising the steps of:

receiving a request for an original first data stored in a first media element of the redundant array;

detecting that said first media element of said redundant array has not provided said original first data within a predetermined time;

in response to said detecting, placing said first media element in a reconstruct mode, wherein said first original data is reconstructed from a second data from at least one other media element of said redundant array to create a reconstructed first data;

transmitting said reconstructed first data to a requester of said original first data;

upon a transmission of said original first data in response to said request for said original first data, discontinuing said reconstruct mode for said first media element;

receiving a subsequent request for an original subsequent data from said first media element of the redundant array while said first media element is in said reconstruct mode;

exclusively reconstructing said original subsequent data from another data from only said at least one other media element of said redundant array, said at least one other media element being different from said first media element; and transmitting said reconstructed subsequent data while said first media element is still in said reconstruct mode.

2. The method of claim 1, wherein said second data is an exclusive-OR equivalent of said original first data, said second data being held on said at least one other media element of said redundant array.

3. The method of claim 1, wherein said second data is a duplicate copy of said original first data, said second data being held on said at least one other media element of said redundant array.

4. The method of claim 1, further comprising:

disregarding by an array controller said transmission of said original first data, said original first data being received by said array controller.

5. The method of claim 1, wherein said media elements of said redundant array are partitions of a hard disk drive.

6. A system for reading data from a redundant array of computer data storage media elements, said system comprising:

means for receiving a request for an original first data stored in a first media element of the redundant array;

means for detecting that said first media element of said redundant array has not provided said original first data within a predetermined time;

means for, in response to said detecting, placing said first media element in a reconstruct mode, wherein said first original data is reconstructed from a second data from at least one other media element of said redundant array to create a reconstructed first data;

means for transmitting said reconstructed first data to a requester of said original first data;

means for, upon a transmission of said original first data in response to said request for said original first data, discontinuing said reconstruct mode for said first media element;

means for receiving a subsequent request for an original subsequent data from said first media element of the redundant array while said first media element is in said reconstruct mode;

means for exclusively reconstructing said original subsequent data from another data from only said at least one other media element of said redundant array, said at least one other media element being different from said first media element; and means for transmitting said reconstructed subsequent data while said first media element is still in said reconstruct mode.

7. The system of claim 6, wherein said second data is an exclusive-OR equivalent of said original first data, said second data being held on said at least one other media element of said redundant array.

8. The system of claim 6, wherein said second data is a duplicate copy of said original first data, said second data being held on said a least one other media element of said redundant array.

9. The system of claim 6, wherein said another data is a duplicate copy of said original subsequent data, said another data being held on said at least one other media element of said redundant array.

10. The system of claim 6, wherein said media elements of said redundant array are partitions of a hard disk drive.

11. A method comprising:

receiving a request for original data from a first disk drive in a first disk array;

determining if the first disk drive is in timeout mode, the timeout mode being a non-error event; and in response to determining that the first disk drive is in a timeout mode, initiating a data recovery operation using other disk drives in the disk array for a reconstructed data, the reconstructed data being a reconstruction of the original data on the first disk drive.

12. The method of claim 11, wherein the timeout mode is initiated by the first disk drive being in the process of loading a new disk drive firmware.

13. The method of claim 11, wherein the timeout mode is initiated by a sector in the first disk drive being in the process of being reassigned.

* * * * *